May 6, 1952  J. SWISS ET AL  2,595,729
ORGANOSILICON COMPOUNDS AND CONDUCTORS INSULATED THEREWITH
Filed March 9, 1945

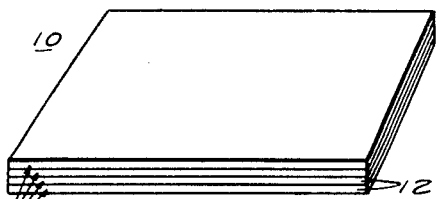
Fig. 1.
Inorganic material impregnated with polymerized allylmethyl silicon compound or interpolymer thereof.

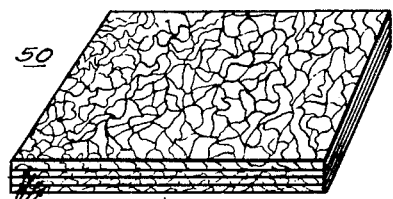
Fig. 5.
Mica flakes bonded with polymerized allyl silicon compound or interpolymer thereof.

Fig. 2.
Insulating coating comprising polymerized allylmethyl silicon compound or interpolymer thereof.

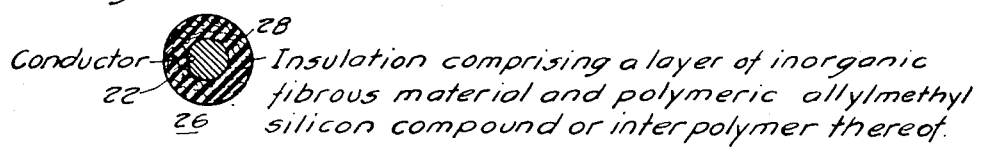
Fig. 3.
Conductor — Insulation comprising a layer of inorganic fibrous material and polymeric allylmethyl silicon compound or interpolymer thereof.

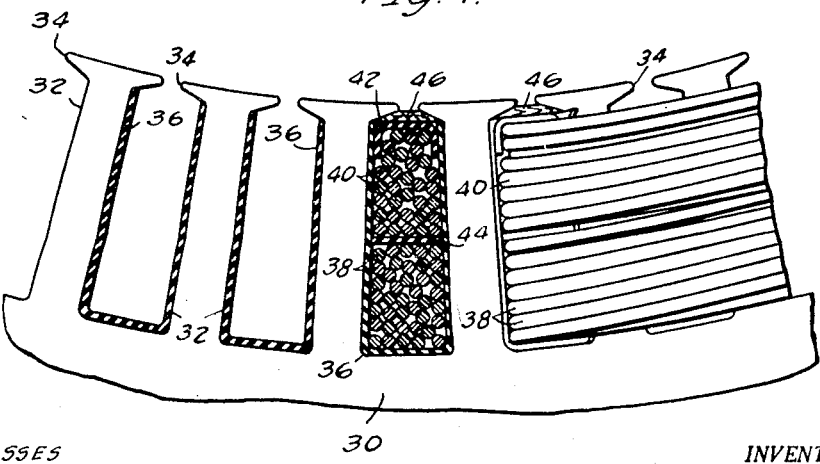
Fig. 4.

WITNESSES

INVENTORS
Jack Swiss and Clyde E. Arntzen.
BY
ATTORNEY

Patented May 6, 1952

2,595,729

UNITED STATES PATENT OFFICE 2,595,729

ORGANOSILICON COMPOUNDS AND CONDUCTORS INSULATED THEREWITH

Jack Swiss, McKeesport, and Clyde E. Arntzen, Pittsburgh, Pa., assignors to Westinghouse Electric Corporation, East Pittsburgh, Pa., a corporation of Pennsylvania Application March 9, 1945, Serial No. 581,838

4 Claims. (Cl. 174—120)

This invention relates to organosilicon compounds, their preparation and use. More particularly, this invention is concerned with new and useful substances comprising organic compounds of silicon having both saturated and unsaturated organic groups attached to the silicon atom.

It is well known in the art that certain organosilicon compounds may be prepared by attaching saturated organic groups to silicon atoms. A number of such silicon compounds have been prepared by replacing one or more of the ethoxyl groups in ethyl silicate, for example, with various alkyl or aryl groups. Saturated organosilicon compounds thus prepared with one, two or three saturated organic radicals attached to the silicon atom can be hydrolyzed to form the corresponding organosilicols which, in turn, dehydrate spontaneously or can be dehydrated to form polymeric organosilicon oxides or siloxanes. The siloxanes are characterized by silicon-oxygen bonds. The silicon-oxygen bond is capable of withstanding much higher temperatures than conventional organic bonds such as carbon-to-carbon or carbon-to-oxygen and the like as found in most organic compounds. Consequently, the siloxanes are excellent for use in applications subjected to elevated temperatures at which ordinary hydrocarbon compounds and their common derivatives cannot be employed continuously.

It is also known that the siloxanes containing saturated organic groups may be prepared and polymerized to form polymers having almost any desired degree of hardness or elasticity. The most useful saturated organosilicon oxide polymers for most commercial uses, however, are those having good flexibility. Experience with the flexible siloxane polymers shows that they have excellent thermal properties but they lack resistance to hydrocarbon solvents, oils and other chemicals. For example, a flexible sheet of a saturated organic siloxane polymer, such as methyl siloxane, when immersed in toluene will swell in a short time and when removed from the toluene will be found to crumble readily when manipulated. This shortcoming greatly limits the possible uses of the saturated organosilicon polymers.

A further drawback in connection with the saturated organosilicon oxide polymers is encountered in preparing solid polymers from low siloxane polymers. The low siloxane polymers, which are usually fluids, require excessive times and temperatures to convert them into higher solid polymers. In nearly all cases, the conversion to a tack-free solid polymer requires more than 6 hours at 250° C.—often as much as 50 hours at 250° C. is necessary for this purpose. This is not only time-consuming, but is costly as well.

The object of this invention is to provide for preparing novel unsaturated organosilicon compounds.

A further object of the invention is to provide for preparing allylmethylsilicon compounds.

A still further object of the invention is to provide for preparing polymeric bodies from allylmethylsilicon compounds.

Another object of this invention is to provide for preparing interpolymers of allylmethylsilicon compounds and saturated organic silicon compounds.

Other objects of the invention will, in part, be obvious and will, in part, appear hereinafter.

For a fuller understanding of the nature and objects of this invention, reference should be had to the following detailed description and drawing, wherein:

Figure 1 is a view in perspective of a laminated member impregnated with a polymerized allylmethylsilicon compound;

Figs. 2 and 3 are greatly enlarged views in cross-section of conductors carrying an insulating coating of polymerized allylmethylsilicon compound;

Fig. 4 is a fragmentary view partly in section of a cross-section of a dynamoelectric stator; and Fig. 5 is a view in perspective of a laminated sheet of mica flakes.

This application is a continuation-in-part of our copending patent application Serial No. 514,372, filed December 15, 1943 entitled "Organo-Silicon Compounds and Products Thereof," now abandoned.

According to this invention, we have produced allylmethylsilicon compounds having the following unit structure:

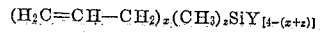

where $x$ is a number from 1 to 2; $z$ is a number from 1 to 3, the sum of $x$ and $z$ does not exceed 4 and Y represents chlorine, ethoxyl, hydroxyl or oxygen or like radicals.

In copending patent applications, we have disclosed other allylsilicon compounds. In our copending patent application, Serial No. 581,839, filed March 9, 1945, and entitled "Organo-Silicon Compounds and Products Thereof," we have disclosed allylphenylsilicon compounds including both the phenyl and substituted phenyl radicals.

In our copending application Serial No. 581,837, filed March 9, 1945, entitled "Organo-Silicon Compounds and Products Thereof," we have disclosed allylsilicon compounds such, for example, as allylsilicon triethoxide and diallylsilicon diethoxide. In our parent case above referred to, we have described the preparation of allylmethylsilicon diethoxide and the preparation of various derivatives thereof. Also, in our copending patent application Serial No. 581,836, filed March 9, 1945, entitled "Organo-Silicon Compounds and Products Thereof," we have disclosed the preparation of methallylsilicon compounds and various products thereof.

In the general preparation of allylsilicon compounds, it is convenient to start with either ethyl orthosilicate or silicon tetrachloride and to treat either of these with a Grignard reagent to substitute the desired allyl and methyl organic groups for the ethoxyl or chlorine groups attached to silicon. The following illustrative examples are given in order that those skilled in the art may better understand how the present invention may be carried out.

Example 1

In preparing allylsilicon ethoxides, to a solution of 8.75 mols of ethyl silicate dissolved in 730 cc. of ethyl ether, a very dilute solution of allylmagnesium chloride dissolved in ethyl ether was added over a period of 42 hours. The allylmagnesium chloride was prepared by introducing allyl chloride slowly to a mass of magnesium shavings in ethyl ether. Approximately seven mols of allylmagnesium chloride so prepared was added to the ethyl silicate.

By means of distillation, allylsilicon ethoxide compounds were separated from the salts formed in the primary reaction. Fractional distillation was applied to the distillate in order to separate the several allyl compounds. Relatively pure allylsilicon triethoxide and diallylsilicon diethoxide, as confirmed by subsequent chemical analysis, were recovered from the fractional distillation.

By varying the ratio of the mols of ethyl silicate to the mols of allylmagnesium chloride, the ratio of the output mols of allylsilicon triethoxide to the diallylsilicon diethoxide can be varied. The reaction is believed to proceed according to the following equation:

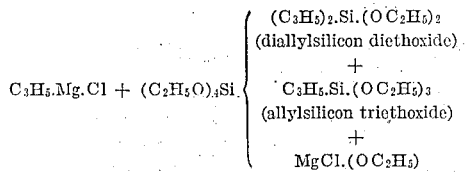

In the above example, allylmagnesium bromide can be used in lieu of allylmagnesium chloride.

By introducing a dilute solution of methylmagnesium chloride in ethyl ether to an ether solution of the allylsilicon triethoxide and diallylsilicon diethoxide, allylmethylsilicon diethoxide and diallylmethylsilicon ethoxide may be prepared. These compounds may be recovered by distillation and separated from one another by fractional redistillation.

Example 2

Allylmethylsilicon diethoxide was prepared by slowly introducing a very dilute solution of allylmagnesium chloride dissolved in ethyl ether to a solution consisting of two gram mols of methylsilicon triethoxide dissolved in 275 cc. of ethyl ether. The methylsilicon triethoxide was prepared originally by adding methylmagnesium chloride to a solution of ethyl orthosilicate and separating by distillation the methylsilicon triethoxide from the magnesium salts. The following equation is believed to represent the reaction resulting in allylmethylsilicon diethoxide

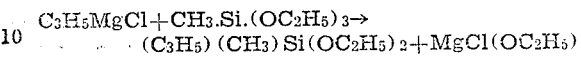

$$C_3H_5MgCl + CH_3.Si.(OC_2H_5)_3 \rightarrow (C_3H_5)(CH_3)Si(OC_2H_5)_2 + MgCl(OC_2H_5)$$

Allylmethylsilicon diethoxide formed by the reaction was removed by distillation from the salts formed during the reaction. Its composition was confirmed by chemical analysis. The physical properties of allylmethylsilicon diethoxide, which is believed to be novel, were: B. P. 154.5° C. (corr.) at 736 mm. and the index of refraction was $n_D^{25}$ 1.4097, and the density $d^{25}$ 0.8597.

Example 3

The novel compounds, allyldimethylsilicon ethoxide and allyltrimethylsilicon were prepared by the following method. Methylmagnesium bromide, prepared from 4.5 gram atoms of magnesium and methyl bromide in either, was added, over a period of 8½ hours to a solution of 1.5 moles of allylsilicon triethoxide in 150 cc. of ether. The liquid was then removed from the salts formed in the reaction by distillation. The allyltrimethylsilicon and allyldimethylsilicon ethoxide obtained by fractional redistillation boiled at 83.0–84.5° (corr.) at 735 mm. and 121.6–124°, respectively. A second redistillation of the allyldimethylsilicon ethoxide gave a purer sample boiling at 122.6–123.2° (corr.) at 743 mm. The index of refraction and density of the allyldimethylsilicon ethoxide were found to be: $n_D^{25}$ 1.4100 and $d^{25}$ 0.7972. The index of refraction and density of the allyltrimethylsilicon were found to be $n_D^{25}$ 1.4036 and $d^{25}$ 0.7158.

Similarly triallylmethylsilicon may be prepared.

Experimental work shows that allyltrimethylsilicon is an exceptionally stable compound. When treated with 1% benzoyl peroxide and refluxed for 92 hours, it did not polymerize. A further addition of 4% of benzoyl peroxide and refluxing for an additional 120 hours failed to cause any observable polymerization. Therefore, the allyltrimethylsilicon does not appear subject to polymerization by ordinary means.

The allylmethylsilicon ethoxides can be polymerized directly to form resinous bodies. The polymerization is believed to take place through the unsaturated group in the allyl radical. For example, when allylmethylsilicon triethoxide containing 3% benzoyl peroxide is heated on a flat surface at 70° C., it produces a hard transparent polymeric film in a short period of time. Suitable catalysts for promoting the polymerization are well known and comprise organic and inorganic peroxides, inorganic acids, inorganic halides and the like. Similarly, diallylmethylsilicon diethoxide and allylmethylsilicon diethoxide may be polymerized under the same conditions in the presence of a catalyst. In addition, mixtures of two or more of the allylmethylsilicon ethoxide compounds can be treated with a small portion of a polymerizing catalyst to produce hard transparent films after heating for a period of time.

Allylmethylsilicon diethoxide was also polymerized with allyl phthalate in the presence of benzoyl peroxide as a polymerizing catalyst to produce a hard and transparent film after 16 hours at 70° C. Similarly, a composition of allyl carbonate with an equal weight of allylmethylsilicon diethoxide produced a hard transparent polymer when treated with a peroxide polymerizing catalyst and heated for a period of time.

All of the allylmethylsilicon ethoxide polymers, including those with allyl phthalate and carbonate additions, were not appreciably affected by hydrocarbon solvents.

Products which are potentially more useful than the ethoxide polymers may be prepared by hydrolyzing the allylmethylsilicon ethoxides to form the respective silicols and the silicols then dehydrated, thereby forming allylmethylsiloxanes. The following equations are believed to represent the successive hydrolysis and dehydration reactions using allylmethylsilicon diethoxide.

$(H_2C=CH-CH_2)(CH_3)Si(OC_2H_5)_2 + 2H_2O \longrightarrow$
$(H_2C=CH-CH_2)(CH_3)Si(OH)_2 + C_2H_5OH$
$(H_2C=CH-CH_2)(CH_3)Si(OH)_2 \longrightarrow$

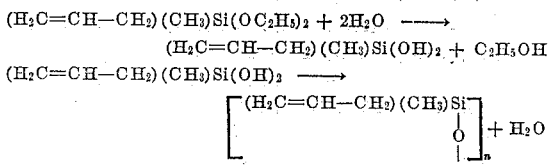

$+ H_2O$

Allyldimethylsilicon ethoxide and diallylmethylsilicon ethoxide when hydrolyzed produce allyldimethyl silicol and diallylmethyl silicol respectively.

For many commercial purposes, it is not necessary to isolate any particular single allylmethylsilicon compound, since mixtures having a predetermined combination of any two or more of the allylmethyl compounds may be hydrolyzed and then dehydrated. The following formulae will be employed hereafter, the first representing the allylmethylsilicon compounds in the various stages of processing and the second is the unit formula of the siloxane:

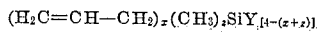

and

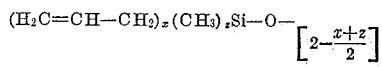

where $x$ and $z$ are each a number from 1 to 2, the sum of $x$ and $z$ not exceeding 3, and Y is ethoxyl, chlorine, or the like.

In some cases, the silicols may be polymerized through the allyl groups in much the same manner as the polymerization of the allylmethylsilicon ethoxides was accomplished. The following example is typical:

*Example 4*

Allylmethylsilicon diethoxide was refluxed under similar conditions to produce:

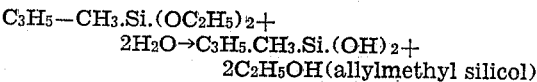

The hydrolysis product was an oily liquid which could be set up into a hard transparent film by heating at 100° C.

It is not known in what proportion the allyl silicols polymerized through the silicon-oxygen linkages and the unsaturated allyl group respectively. Evidence has been secured which points to some substantial part of the polymerization being effected by each of these reactions.

During the dehydration of the allylmethylsilicols, a molecule of water is eliminated between two hydroxyl groups and condensation takes place to form polymers having alternate silicon-oxygen bonds. The dehydration is preferably carried out in the presence of a dehydrating agent, particularly materials capable of absorbing or chemically combining with water. Boric acid esters, such for example as methyl borate, metal halides, the oxides and halides of phosphorus, sulphuric acid and hydrochloric acid have been found to be suitable dehydrating agents. Heating is advised in order to expedite the dehydration.

The nature of the products produced by the condensation reaction with the formation of silicon-oxygen bonds is greatly determined by the kind and proportion of hydrolyzable groups present in the silicon compound being converted to the silicone. Thus, when hydrolyzed and then dehydrated, the triethoxides form three dimensional polymers and the diethoxides form linear polymers while the monoethoxides can form only a single silicon-oxygen linkage and therefore tend to terminate a polymer chain. Consequently, a mixture containing a high proportion of the monoethoxide will tend to produce relatively small silicon oxide polymer units. On the other hand, a large proportion of the triethoxide will tend to the formation of solid, high softening, cross-linked polymers. However, for most purposes a flexible polymer with a moderate amount of cross-linkage is preferred. This last type of polymer is characterized by a large proportion of molecules containing two organic groups attached to each silicon atom. In commercial practice the siloxane polymers are usually prepared from mixtures of two or more different silicon compounds. By the proper proportioning of the components, polymers may be secured having predetermined properties within a wide range of choice.

In general, the dehydration of the allylmethyl silicon compounds is carried out initially only to the extent that a low viscosity fluid of an oily nature which is solvent soluble is produced. As condensation is prolonged, particularly with heating, thick gummy masses or solids result.

The outstanding advantage of the allylmethyl siloxanes of this invention is that the polymers have been found to improve on the shortcomings of saturated organo-silicones, particularly the poor solvent resistance of the latter. Further, unexpected and highly desirable results are obtained when allyl silicon compounds are combined with the saturated organic silicon compounds. The solid polymeric products of the methyl siloxanes, ethyl siloxanes, phenyl ethyl siloxanes and phenyl methyl siloxanes and similar saturated alkyl and aryl organosilicon compounds have been greatly improved in their physical and chemical properties by the addition of small amounts of the allylmethyl siloxanes, particularly when combined so that interpolymers or copolymers are formed. Siloxane interpolymers containing from 0.1% to 10% by weight of allylmethyl siloxane form flexible resinous bodies such as films, coatings, sheets and the like, characterized by extraordinary heat stability, resistance to hydrocarbon solvents, oils and water and resistance to deterioration from oxygen and other usually harmful substances. In other cases, as much as 50% of the weight of the interpolymers may be composed of allylmethyl siloxane with highly advantageous results. The allylmethyl siloxanes enable cross-linking through the unsaturated group in the allyl radical whereby the molecules are linked by strong primary valence forces.

The one component of the siloxane interpolymers may be a siloxane derived by hydrolyzing and then dehydrating a saturated organic silicon compound having the unit structure $$R_xSiY_{(4-x)}$$

where R is a saturated alkyl or aryl radical, $x$ is from 1 to 3 and Y is a halide, ethoxide or other hydrolyzable group. Since the silicon monomers used are usually mixtures, $x$ may be other than a whole number. For most purposes, a certain low minimum of the compound where $x$ is 3 is desired. The interpolymers may be prepared by admixing the saturated organic siloxane with any or all of the allylmethyl siloxanes herein disclosed. Other allylsilicon compounds such as are disclosed and described in our other copending patent applications hereinbefore mentioned may be admixed with the allylmethyl silicon compounds of the instant invention. The admixing may be accomplished either with the siloxanes as liquids of a low degree of polymerization or with solutions of either or both in a solvent. It is believed that better results are obtained, however, if the saturated organosilicon ethoxides are admixed with the allylmethyl silicon ethoxides (or the corresponding silicon halides) and hydrolysis and dehydration is carried out thereafter upon the mixture. The following are typical examples of the procedure for producing interpolymers:

Example 5

To a mixture composed of 72.4 g. (.49 mol) of dimethylsilicon diethyoxide and 1.4 g. (0.01 mol) of allyldimethylsilicon ethoxide in 50 cc. of toluene was added dropwise 50 cc. of 5% sulfuric acid. The initial hydrolysis product was treated with 40 cc. of 75% sulfuric acid for 20 minutes and then diluted with chipped ice.

There was obtained an oily liquid of 151 c. t. s. k. s. viscosity at 25°. With the addition of 3% tert-butyl perbenzoate and 0.1% of a chromium chelate compound the liquid siloxane interpolymer dried hard in 4 hours at 250° C.

One of the outstanding properties, from a practical viewpoint, of the interpolymers of an allylmethyl siloxane and a saturated organic siloxane is the greatly improved drying time. For example, a methyl siloxane may require heating as much as 50 or 100 hours at 200° C. and 12 hours and more at 250° C. to produce a dry film of the polymer. By comparison, the interpolymers of saturated organic siloxanes with as little as 1% of the allylmethyl siloxane can be dried tack-free in about 3 hours at 200° C. and only a fraction of an hour at 250° C. Obviously, this improvement in drying times and temperatures enables the economical application of the polymers in preparing various types of apparatus. Not only is the processing more rapid, but the life of the resulting resinous polymer is not affected by the disproportionate drying times previously required with saturated siloxanes.

In preparing various copolymers, good results have been obtained where the mole proportion of allyl radical in the copolymer with the saturated alkylsilicon compounds has ranged from less than 10% to 50% or more. This proportion of allylmethylsilicon compound when copolymerized with saturated alkylsilicon compounds, such as methylsilicon compounds, expedites fast setting at lower temperatures. For example, 16 mole percent of allylmethylsiloxane forming a copolymer with a methylsilicone will lower the setting temperature from 200° C. to 120° C. for a given heating period. The benefits of a lower setting temperature are particularly desirable since it has been found that higher setting temperatures frequently result in the oxidation of the base member to which the siloxane resin is being applied with the resultant weakening of the bond between the resin and the member.

A still further advantage which is secured by copolymerizing allylmethylsilicon compounds with saturated alkyl silicon compounds is the improvement in physical properties at high temperatures. A body consisting of a dimethyl siloxane resin is barely able to support its own weight at 200° C. A hydrolyzed and condensed copolymer of 33% allylmethylsilicon diethoxide and 67% dimethylsilicon diethoxide has been found to be structurally strong at 200° C., whereby it can support a considerable load without failure.

In interpolymers containing allylmethylsilicon compounds, besides the silicon-oxygen bonds, cross-linking appears to take place through the unsaturated allyl groups and the molecules appear to be united with strong primary valence forces. For this reason, the solvent resistance and other mechanical properties are greatly increased, and a much more usable resinous material is secured.

In preparing the interpolymers of saturated organic silicon and allylmethylsilicon compounds, it has been found that a desirable process to follow is initially to hydrolyze a mixture in predetermined proportions of the respective saturated organic silicon ester and the allylmethylsilicon ester. The hydrolysis product is then dehydrated and partially polymerized, for example, by heating for a short period of time until a relatively viscous liquid or gum-like mass is produced, but the polymerization should not be carried out to that extent that the mass is rendered insoluble in a hydrocarbon solvent such as toluene. Toluene or other hydrocarbon solvent is then applied to the partially polymerized mass to produce a liquid varnish suitable for application to members. Such varnish will be relatively fluid and capable of readily penetrating the pores and interstices of various fibrous or porous base members.

The allylmethyl siloxane or its interpolymers need not be dissolved in a solvent, but may be dispersed or emulsified in a volatile liquid carrier such as water. For this purpose the water is rendered alkaline with ammonia, for example, and a dispersing agent added such, for instance, as a sodium alkyl sulfonate ester. Hydrolyzed polyvinyl esters and a simple alcohol, such as ethyl alcohol, may be present in small amounts to facilitate dispersion of the silicon oxide polymer and to render the dispersion more stable. The fluid silicon oxide polymer admixed with the water and the conditioning agents is passed through a suitable dispersing device such, for example, as a gear pump or a colloid mill, to break up the siloxane into finely divided particles and to establish a stable emulsion. By employing water there is a great reduction in fire hazard. In either event a low viscosity solution in a volatile liquid carrier is secured. After applying to a suitable base material, preferably an inorganic substance, the varnish is subjected to drying to remove the volatile liquid carrier such as water or the solvent. The viscous or gum-like siloxane interpolymer will be retained by the pores or interstices of the materials whereby it will not exude or escape during further processing. When the base material is more or less completely processed, as by cutting, shaping, bending, compacting or stretching, and the like, the silicon oxide interpolymer impregnant may be completely polymerized to a state in which it is hard and resistant to solvents, while maintaining a predetermined flexibility.

In some cases, interpolymers may be prepared by dehydrating and partially polymerizing saturated alkyl or aryl silicols to low polymer siloxanes which are quite fluid and mixing with allymethyl siloxanes dehydrated and partially polymerized to about the same extent so that they are miscible liquids. Further, polymerization may then be carried out on the mixture. If the mixing of the partial polymers is difficult due to the fact that they are rather viscous they can be dissolved in a hydrocarbon solvent and mixed more readily in solution and interpolymerization may then be accomplished to produce the combined siloxanes. It will be appreciated that a less intimate blending of the allylmethyl silicon molecules and the saturated organic silicon molecules is obtained by these latter procedures.

Referring to Fig. 1 of the drawing, there is illustrated a laminated member 10 produced according to the process disclosed herein. Each of the plurality of laminations 12 of the body 10 may be of any suitable inorganic material, such as glass fibers in the form of cloth, felt, tape, or the like, or an asbestos cloth or felt or asbestos paper, or other inorganic body. For highest strength, continuous filament glass fibers are desirable. The laminations 12 are preferably impregnated with a varnish solution of an allylmethyl silicon oxide polymer or a partially interpolymerized allylmethylsilicon compound and a saturated aryl or alkylsilicon compound. The laminations upon drying to remove the solvent are then cut to shape and stacked. The stacked laminations are then molded under pressure to predetermined form at suitable temperatures of from 70° C. to 200° C. or more, depending on the rapidity desired for the polymerization. A solid, well bonded body is obtained by the process.

A particularly advantageous application for the interpolymers of the present invention is their use as electrical insulation where their ability to withstand high temperatures for prolonged periods of time as compared to the known all-organic insulating materials is especially desirable.

Referring to Fig. 2 of the drawing, there is illustrated an insulated conductor 20 comprising a metallic conductor 22 and an insulating coating 24 of a polymerized allylmethyl siloxane applied thereto. The interpolymers of an allylmethylsilicon compound and a saturated aryl or alkyl silicon compound polymerized to the state that they are relatively viscous while still soluble in a suitable hydrocarbon solvent may be applied to the conductor 22 in solution similar to a conventional wire enamel. The conductor may be immersed in a solution or dispersion of the siloxane and subjected to heat to first remove the hydrocarbon solvent and then to polymerize the resin. A polymerizing catalyst may be added in order to expedite the drying operation.

Referring to Fig. 3 of the drawing, there is shown an insulated conductor 26 comprising a metal conductor 22 carrying insulation 28. The insulation 28 comprises one or more layers of an inorganic fibrous material, such as asbestos fibers, cloth, or the like, or glass fiers in the form of staple fiber, sliver, continuous filaments, yarn, tape or the like. Thereafter, the interstices of the fibrous material are impregnated with a varnish of allylmethyl siloxane or siloxane interpolymer or copolymer.

Fig. 4 of the drawing illustrates the application of the interpolymers to a dynamo-electric machine. The stator 30 of a motor or generator, for example, comprising a plurality of laminations of magnetic material, contains a plurality of slots 32 machined in the laminations. The slots 32 are so machined that a narrow entering groove 34 is provided at the top to permit the introduction of conductors and the like and to facilitate retaining such conductors in the slots 32. Slot-cell liners 36 prepared from an inorganic material, such, for example, as glass-fiber cloth and coated with an allylmethyl siloxane interpolymer, are placed within the slots 32. Coils 38 and 40 are wound within the slot cell 32 lined with the insulating liner 36 according to the conventional practice. The conductors of the coils 38 and 40 are insulated with the allylmethyl siloxane interpolymer described herein. The phase insulating separator 42 and the liner strip 44 may be made in a manner similar to the slot-cell liner 36 and applied to insulate the coils 38 and 40 from the rest of the apparatus. A wedge 46, which may be prepared from suitable inorganic materials, or, in some cases, from glass-fiber cloth impregnated with the polymeric resins of this invention and polymerized to shape under pressure, is driven into the top of the slot to retain the coils in their predetermined position.

In some cases, conductors may be insulated by coating with the partially polymerized interpolymer without requiring the preparation of a varnish solution thereof in a volatile solvent by extruding the viscous partial polymer about the conductor by means of a die.

In preparing polymeric bodies from the allylmethyl-silicon ethoxides as well as the allylmethyl siloxanes and interpolymers of allylmethyl siloxanes, it may be desirable in many instances to embody therein finely divided inorganic materials, such, for example, as silica flour, bentonite, glass powders, calcium fluoride, ceramic powders and the like. A paste or thick liquid may be prepared from the silicon compound by incorporating a suitable amount of pulverized inorganic powder—for example, up to 50% by weight of the whole. The paste may be applied as a filler to electrical coils and other electrical apparatus. Upon heat treatment with or without a polymerizing catalyst, a hard, dense, solvent-resistant polymeric mass will be obtained. In other cases, the siloxane with the inorganic filler may be cast into suitable members for any application. They can be machined to shape.

The siloxane interpolymer embodying a proportion of allylmethylsilicon compound may be applied to mica flakes in solution in a solvent and thereafter drying out sheets or bodies built up therefrom to remove the solvent, molding to shape and completing polymerization of the siloxane into a hard, solvent-resistant state. Referring to Fig. 5 of the drawing, there is illustrated a sheet 50 composed of mica flakes bonded by means of the resinous polymers, copolymers or interpolymers having allyl and methyl groups attached to silicon atoms. The mica sheet may be prepared with a backing of an inorganic fibrous material such, for example, as glass fibers or asbestos in fabric form.

The several polymerizable allylmethylsilicon compounds described herein may be combined with finely divided graphite, anthracite coal or coke, either coal coke or petroleum coke heat treated at 500° C. to 700° C. to produce semiconducting paints and varnishes. Such paints and varnishes are particularly useful for application to generators and other high voltage apparatus operating above 6900 volts to reduce or eliminate the generation of corona thereon. Both the anthracite coal and coke are stable at temperatures of 200° C. to 300° C. or even higher.

Since certain changes in carrying out the above processes and certain modifications in the apparatus and applications embodying the materials produced by the processes of the invention may be made without departing from its scope, it is intended that all the matter contained in the above description or shown in the accompanying drawing shall be interpreted as illustrative and not in a limiting sense.

We claim as our invention:

1. A solid organosiloxane interpolymer comprising the heat-treated product of an organosiloxane interpolymer composed of between 0.1% and 10% by weight of allyl methyl siloxane units derived by hydrolyzing and condensing an organosilicon compound having the formula $$(H_2C=CH-CH_2)_x(CH_3)_zSiY_{[4-(x+z)]}$$

where $x$ and $z$ each represent a number from 1 to 2, and the sum of $x$ and $z$ does not exceed 3, Y is a monovalent radical selected from the group consisting of chlorine and ethoxyl radicals, and the balance being organosiloxane units derived by hydrolyzing and condensing an organosilicon compound having the average formula $$R_nSiY_{(4-n)}$$

where R is a monovalent radical selected from the group consisting of saturated alkyl and aryl radicals and $n$ represents a number between 1 and 2, at least the condensation being effected while the two silicon compounds are intermixed, the solid interpolymer having both Si—O—Si linkages and cross-linkages derived through the allyl groups.

2. An article of manufacture comprising an inorganic fibrous material and applied thereto a solid organosiloxane interpolymer comprising the heat-treated product of an organosiloxane interpolymer composed of between 0.1% and 10% by weight of allyl methyl siloxane units derived by hydrolyzing and condensing an organosilicon compound having the formula $$(H_2C=CH-CH_2)_x(CH_3)_zSiY_{[4-(x+z)]}$$

where $x$ and $z$ each represent a number from 1 to 2, and the sum of $x$ and $z$ does not exceed 3, Y is a monovalent radical selected from the group consisting of chlorine and ethoxyl radicals, and the balance being organosiloxane units derived by hydrolyzing and condensing an organosilicon compound having the average formula $$R_nSiY_{(4-n)}$$

where R is a monovalent radical selected from the group consisting of saturated alkyl and aryl radicals and $n$ represents a number between 1 and 2, at least the condensation being effected while the two silicon compounds are intermixed, the solid interpolymer having both Si—O—Si linkages and cross-linkages derived through the allyl groups.

3. An insulated electrical conductor comprising, in combination, an electrical conductor and insulation applied thereto comprising a solid organosiloxane interpolymer comprising the heat-treated product of an organosiloxane interpolymer composed of between 0.1% and 10% by weight of allyl methyl siloxane units derived by hydrolyzing and condensing an organosilicon compound having the formula $$(H_2C=CH-CH_2)_x(CH_3)_zSiY_{[4-(x+z)]}$$

where $x$ and $z$ each represent a number from 1 to 2, and the sum of $x$ and $z$ does not exceed 3, Y is a monovalent radical selected from the group consisting of chlorine and ethoxyl radicals, and the balance being organosiloxane units derived by hydrolyzing and condensing an organosilicon compound having the average formula $$R_nSiY_{(4-n)}$$

where R is a monovalent radical selected from the group consisting of saturated alkyl and aryl radicals and $n$ represents a number between 1 and 2, at least the condensation being effected while the two silicon compounds are intermixed, the solid interpolymer having both Si—O—Si linkages and cross-linkages derived through the allyl groups.

4. An insulated electrical conductor comprising, in combination, an electrical conductor and insulation applied thereto comprising an inorganic fibrous material and applied to the fibrous material a solid organosiloxane interpolymer comprising the heat-treated product of an organosiloxane interpolymer composed of between 0.1% and 10% by weight of allyl methyl siloxane units derived by hydrolyzing and condensing an organosilicon compound having the formula $$(H_2C=CH-CH_2)_x(CH_3)_zSiY_{[4-(x+z)]}$$

where $x$ and $z$ each represent a number from 1 to 2, and the sum of $x$ and $z$ does not exceed 3, Y is a monovalent radical selected from the group consisting of chlorine and ethoxyl radicals, and the balance being organosiloxane units derived by hydrolyzing and condensing an organosilicon compound having the average formula $$R_nSiY_{(4-n)}$$

where R is a monovalent radical selected from the group consisting of saturated alkyl and aryl radicals and $n$ represents a number between 1 and 2, at least the condensation being effected while the two silicon compounds are intermixed, the solid interpolymer having both Si—O—Si linkages and cross-linkages derived through the allyl groups.

JACK SWISS.
CLYDE E. ARNTZEN.

REFERENCES CITED

The following references are of record in the file of this patent:

UNITED STATES PATENTS

| Number | Name | Date |
|---|---|---|
| 2,258,220 | Rochow | Oct. 7, 1941 |
| 2,377,689 | Hyde | June 5, 1945 |
| 2,386,793 | Hanford | Oct. 16, 1945 |
| 2,388,161 | Kropa | Oct. 30, 1945 |
| 2,397,727 | Daudt | Apr. 2, 1946 |
| 2,409,633 | Kropa | Oct. 22, 1946 |
| 2,413,582 | Rust | Dec. 31, 1946 |
| 2,436,304 | Johannson | Feb. 17, 1948 |
| 2,486,162 | Hyde | Oct. 25, 1949 |

OTHER REFERENCES

Hurd, Journal American Chemical Society, vol. 67, October 1945, pp. 1813 and 1814.